(12) United States Patent
Kim et al.

(10) Patent No.: US 8,406,524 B2
(45) Date of Patent: Mar. 26, 2013

(54) APPARATUS, METHOD, AND MEDIUM OF GENERATING VISUAL ATTENTION MAP

(75) Inventors: Ji Won Kim, Seoul (KR); Yong Ju Jung, Daejeon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 435 days.

(21) Appl. No.: 12/726,616

(22) Filed: Mar. 18, 2010

(65) Prior Publication Data

US 2010/0246954 A1   Sep. 30, 2010

(30) Foreign Application Priority Data

Mar. 31, 2009   (KR) .................. 10-2009-0027461

(51) Int. Cl.
*G06K 9/46* (2006.01)
*G06K 9/32* (2006.01)
*G09G 7/00* (2006.01)

(52) U.S. Cl. .................. 382/190; 382/298; 345/660

(58) Field of Classification Search .................. 382/168, 382/170, 173, 190, 232, 250, 276, 298, 305, 382/312; 358/1.2, 522, 528; 345/418, 660, 345/670; 348/240.08, 240.18, 240.21
See application file for complete search history.

(56) References Cited

U.S. PATENT DOCUMENTS 6,934,415 B2 * 8/2005 Stentiford ............. 382/205
7,773,813 B2 * 8/2010 Hua et al. ............. 382/224
7,940,985 B2 * 5/2011 Sun et al. ............. 382/173

OTHER PUBLICATIONS

R. Zhang, P. Tsai, J. Cryer, and M. Shah, Shape from shading: A survey, *IEEE PAMI*, 21:690-706, 1999.
A. Criminisi, I. Reid, and A. Zisserman, Single view metrology. *IJCV*, 40:123-148, 2000.
A. Santella, M. Agrawala, D. Decarlo, D. Salesin, and M. Cohen. ,Gaze-based interaction for semi-automatic photo cropping, In *CHI*, pp. 771-780, 2006.
L. Chen, X. Xie, X. Fan, W. Ma, H. Shang, and H. Zhou, A visual attention mode for adapting images on small displays, Technical report, Microsoft Research, Redmond, WA, 2002.
H. Nothdurft, Salience from feature contrast: additivity across dimensions, Vision Research, 40:1183-1201, 2000.

* cited by examiner

Primary Examiner — Kanjibhai Patel
(74) Attorney, Agent, or Firm — Staas & Halsey LLP

(57) ABSTRACT

A method, apparatus, and medium of generating a visual attention map. A visual attention map to extract visual attention may be generated to convert a two-dimensional (2D) image into a three-dimensional (3D) image based on visual attention. The 2D image may be downscaled and at least one downscaled image may be generated. A feature map may be extracted from the 2D image and the at least one downscaled image, and the visual attention map may be generated.

19 Claims, 14 Drawing Sheets

APPARATUS, METHOD, AND MEDIUM OF GENERATING VISUAL ATTENTION MAP

CROSS-REFERENCE TO RELATED APPLICATIONS

This application claims the benefit of Korean Patent Application No. 10-2009-0027461, filed on Mar. 31, 2009, in the Korean Intellectual Property Office, the disclosure of which is incorporated herein by reference.

BACKGROUND

1. Field

Example embodiments relate to an apparatus, method, and medium of generating a visual attention map to convert a two-dimensional (2D) image into a three-dimensional (3D) image based on visual attention.

2. Description of the Related Art

Currently, users may be provided with a three-dimensional (3D) image due to the development of a 3D display device. Accordingly, the demand for 3D contents is gradually increasing.

In general, two-dimensional (2D) images from multiple viewpoints are required to provide a 3D image. In a related art, however, a 2D image of a single viewpoint created in advance may not be used.

Technologies converting a 2D image to a 3D image are required to use contents, created in advance, in a next generation display device. In a conventional art, a 2D image may be converted into a 3D image by generating a depth map, generating parallax, and generating a left image and a right image. However, generating a depth map is technically demanding.

Accordingly, a method and apparatus of generating a visual attention map is required to generate a 3D image based on visual attention.

SUMMARY

According to example embodiments, there may be provided an apparatus of generating a visual attention map, the apparatus including a downscaling unit to downscale a two-dimensional (2D) image and generate at least one downscaled image, a feature map generation unit to extract feature information from the 2D image and the at least one downscaled image, and to generate at least one feature map, and an attention computation unit to perform low-level attention computation using the at least one feature map, and to generate the visual attention map based on a result of the low-level attention computation.

The downscaling unit may downscale the 2D image into a plurality of rectangular blocks.

The downscaling unit may include a horizontal downscaling unit to downscale the 2D image in a horizontal direction, and to generate the at least one downscaled image, and a vertical downscaling unit to downscale the 2D image in a vertical direction, and to generate the at least one downscaled image.

The attention computation unit may include an area setting unit to set a center area and a surround area, including the center area, with respect to the at least one feature map, a histogram computation unit to compute a feature information histogram distance between the center area and the surround area, and an attention map generation unit to generate the visual attention map using the feature information histogram distance.

Feature information histograms of the feature information histogram may be at least one of an intensity histogram and a color histogram.

The histogram computation unit may compute the feature information histogram distance using a Chi-square of a histogram of the center area and a histogram of the surround area.

The area setting unit may include a unit block setting unit to set a unit block of a square or a rectangle, a center area setting unit to set the center area as a size of the unit block, and a surround area setting unit to set the surround area as a total size of a plurality of unit blocks.

The attention computation unit may include an area setting unit to set a center area and a surround area, including the center area, with respect to the at least one feature map, a histogram generation unit to generate respective feature information histograms of the center area and the surround area, a histogram computation unit to compute a feature information histogram distance using a moment of the feature information histograms, and an attention map generation unit to generate the visual attention map based on the feature information histogram distance. The moment may include at least one of a mean, a variance, a standard deviation, and a skewness.

According to other example embodiments, there may be provided an apparatus of generating a visual attention map, the apparatus including a block division unit to divide a 2D image into a plurality of blocks, an area setting unit to select at least one block of the plurality of blocks as a center area, and to select at least one block from a surround area adjacent to the center area as a surround block, a feature information extraction unit to extract first feature information of the center area and second feature information of the surround area, and a histogram computation unit to compute a histogram distance between the first feature information and the second feature information, and to generate the visual attention map.

The histogram computation unit may compute the histogram distance using a Chi-square of a histogram of the first feature information and a histogram of the second feature information.

The histogram computation unit may generate the visual attention map using a moment of respective histograms of the first feature information and the second feature information, the moment including at least one of a mean, a variance, a standard deviation, and a skewness.

According to example embodiments, there may be provided a method of generating a visual attention map, the method including downscaling a 2D image and generating at least one downscaled image, extracting feature information from the 2D image and the at least one downscaled image, and generating at least one feature map, and performing low-level attention computation using the at least one feature map, and generating the visual attention map based on a result of the low-level attention computation.

The generating of the at least one downscaled image may include downscaling the 2D image in a horizontal direction, and generating the at least one downscaled image, and downscaling the 2D image in a vertical direction, and generating the at least one downscaled image.

The generating of the visual attention map may include setting a center area and a surround area with respect to the at least one feature map, the surround area including the center area, computing a feature information histogram distance between the center area and the surround area, and generating the visual attention map using the feature information histogram distance.

Feature information histograms of the feature information histogram distance may be at least one of an intensity histogram and a color histogram.

The computing of the feature information histogram distance uses a Chi-square of a histogram of the center area and a histogram of the surround area.

The setting of the center area and the surround area may include setting a unit block of a square or a rectangle, setting the center area as a size of the unit block, and setting the surround area as a total size of a plurality of unit blocks.

The generating of the visual attention map may include setting a center area and a surround area with respect to the at least one feature map, the surround area including the center area, generating respective feature information histograms of the center area and the surround area, computing a feature information histogram distance using a moment of the feature information histograms, and generating the visual attention map based on the feature information histogram distance, wherein the moment includes at least one of a mean, a variance, a standard deviation, and a skewness.

According to example embodiments, there may be provided a computer-readable recording medium storing a program causing at least one processing element to implement a method of generating a visual attention map, the method including downscaling a 2D image and generating at least one downscaled image, extracting feature information from the 2D image and the at least one downscaled image, and generating at least one feature map, and performing low-level attention computation using the at least one feature map, and generating the visual attention map based on a result of the low-level attention computation.

Additional aspects of the example embodiments will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
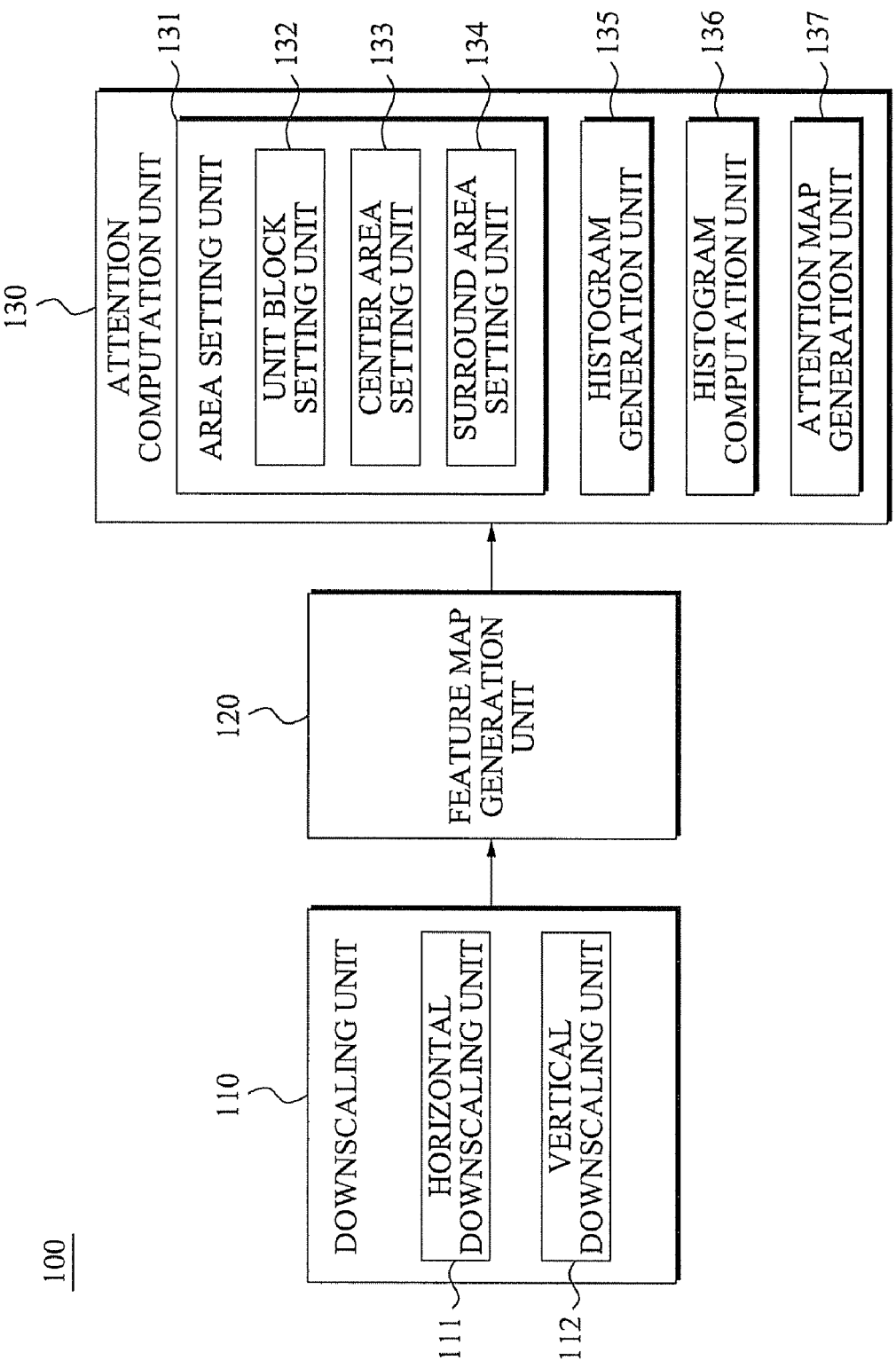
FIG. 1 illustrates a configuration of an apparatus of generating a visual attention map according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a configuration of an apparatus 100 of generating a visual attention map according to example embodiments.

Referring to FIG. 1, the apparatus 100 of generating a visual attention map, hereinafter, referred to as the apparatus 100, may include a downscaling unit 110, a feature map generation unit 120, and an attention computation unit 130.

The downscaling unit 110 may downscale a two-dimensional (2D) image and generate at least one downscaled image. For example, the downscaling unit 110 may downscale the 2D image and generate at least one rectangular image. Also, the downscaling unit 110 may include a horizontal downscaling unit 111 and a vertical downscaling unit 112.

The horizontal downscaling unit 111 may downscale the 2D image in a horizontal direction, and generate the at least one downscaled image. The vertical downscaling unit 112 may downscale the 2D image in a vertical direction, and generate the at least one downscaled image. The operation of generating the at least one downscaled image is described in detail with reference to FIG. 2.

Figure 2:
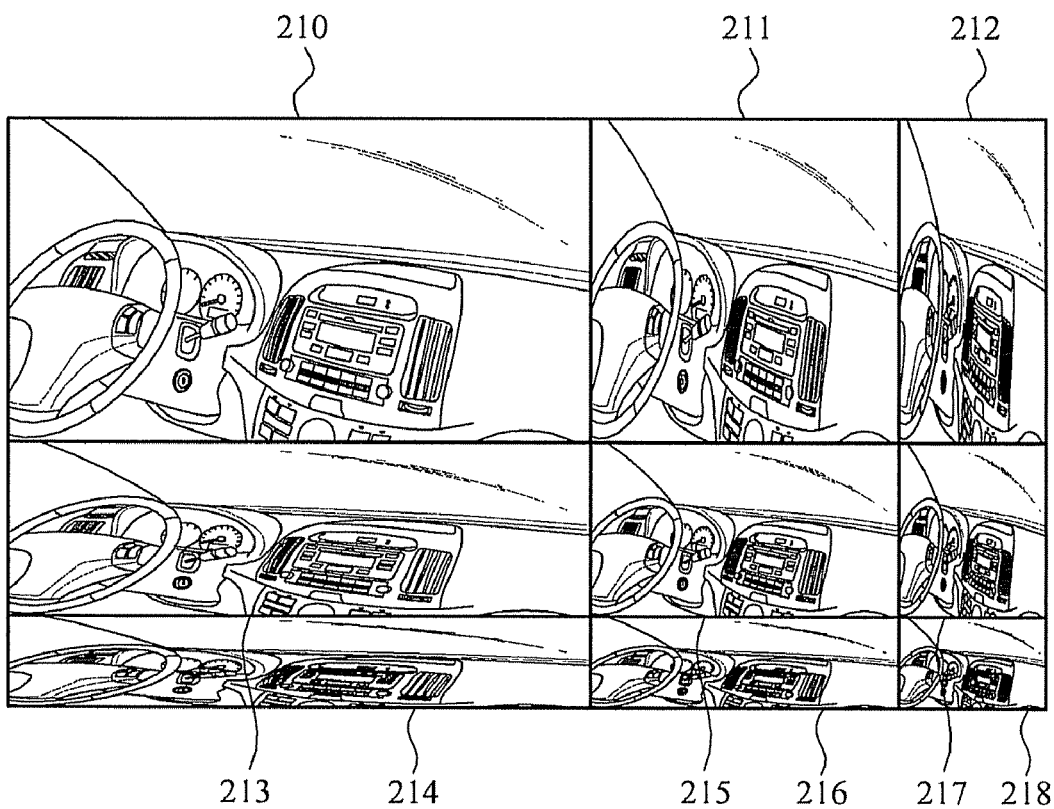
FIG. 2 illustrates an operation of downscaling a two-dimensional (2D) image according to example embodiments.

FIG. 2 illustrates an operation of downscaling a 2D image according to example embodiments.

Referring to FIG. 2, an original 2D image 210 may be downscaled m times in a horizontal direction, and n times in a vertical direction, and thereby may generate a rectangular pyramid. The rectangular pyramid, generated by downscaling the 2D image two times in a horizontal direction and two times in a vertical direction, is illustrated in FIG. 2. That is, two downscaled images 213 and 214 are generated by downscaling the 2D image 210 two times in a horizontal direction. Also, four downscaled images 215, 216, 217, and 218 may be generated by downscaling each of the two downscaled images 213 and 214 two times in a vertical direction. Two downscaled images 211 and 212 may be generated by downscaling the original 2D image 210 two times in a vertical direction. Accordingly, the rectangular pyramid including nine images, including the 2D image 210, may be generated.

A feature map may be extracted using the downscaled rectangular image. Also, a visual attention on an object may be more accurately extracted using a center-surround histogram scheme.

Referring again to FIG. 1, the feature map generation unit 120 may extract feature information from the 2D image and the at least one downscaled image, and thereby may generate at least one feature map. In this instance, the feature information histogram may include at least one of a luminance, a color, a texture, a motion, and an orientation.

The attention computation unit 130 may perform low-level attention computation using the at least one feature map, and generate the visual attention map based on a result of the low-level attention computation. In this instance, a center-surround histogram distance may be extracted to perform the low-level attention computation using the at least one feature map. In this instance, the attention computation unit 130 may include an area setting unit 131, a histogram generation unit 135, a histogram computation unit 136, and an attention map generation unit 137.

The area setting unit 131 may set a center area and a surround area with respect to the at least one feature map. The surround area may include the center area. The area setting unit 131 may include a unit block setting unit 132, a center area setting unit 133, and a surround area setting unit 134.

The unit block setting unit 132 may set a unit block of a square or a rectangle. A number of combinations of the center area and the surround area may exponentially increase depending on a size of the 2D image. Accordingly, the unit block may be used to reduce the number of combinations of the center area and the surround area.

The center area setting unit 133 may set the center area as a size of the unit block, and the surround area setting unit 134 may set the surround area as a total size of a plurality of unit blocks. The operation of setting the center area and the surround area using the unit block is described in detail with reference to FIG. 3.

Figure 3:
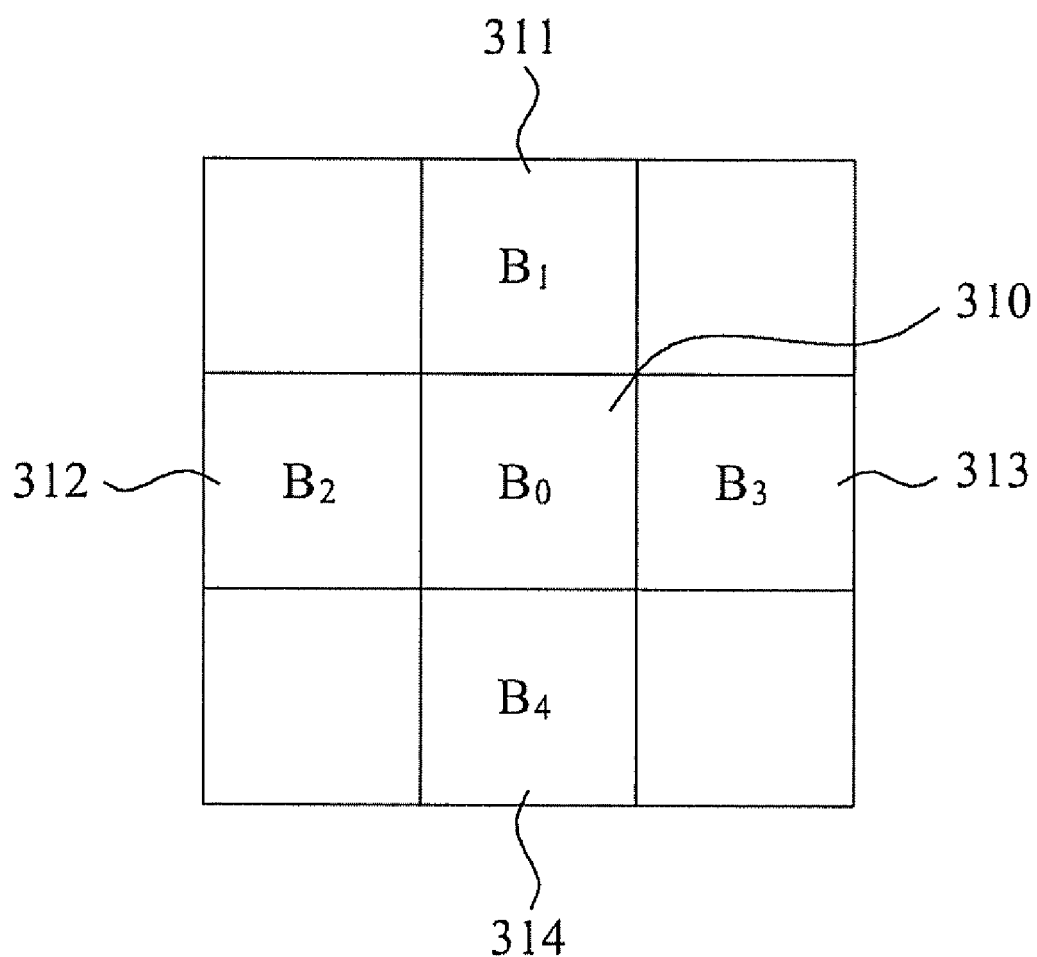
FIG. 3 illustrates an operation of setting a center area and a surround area based on a unit block, according to example embodiments.

FIG. 3 illustrates an operation of setting a center area and a surround area based on a unit block according to example embodiments.

Referring to FIG. 3, a unit block having an arbitrary size may be set, and the center area and the surround area may be comprised of combination of only unit blocks. For example, an image with a variety of scales may be generated by downscaling the original 2D image, and the center area may correspond to a single unit block. In this instance, the surround area may be set as k neighborhood blocks including the block corresponding to the center area. For example, as shown in FIG. 3, a single block $B_0$ 310 may be set as the center area, and four blocks. $B_1$ 311, $B_2$ 312, $B_3$ 313, and $B_4$ 314, may be set as the surround area. Accordingly, a histogram distance of the block $B_0$ 310 and a histogram distance between the block $B_0$ 310 and the four blocks, $B_1$ 311, $B_2$ 312, $B_3$ 313, and $B_4$ 314, may be obtained.

Referring again to FIG. 1, the histogram computation unit 136 may compute a feature information histogram distance of the center area and a histogram distance of the surround area. That is, a histogram of the center area and a histogram of the surround area may be generated, and the distance between the histogram of the center area and the histogram of the surround area may be computed. Here, the histogram may be at least one of an intensity histogram and a color histogram. The operation of computing the histogram distance is described in detail with reference to FIG. 4.

Figure 4:
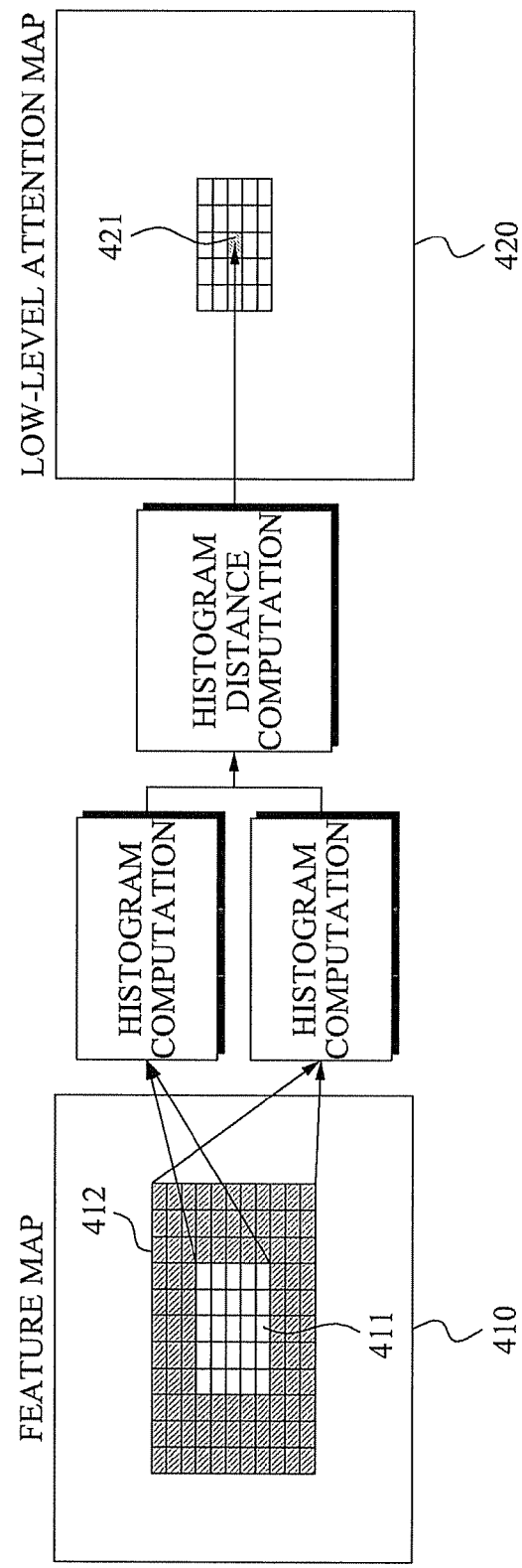
FIG. 4 illustrates a low-level attention computation method according to other example embodiments.

FIG. 4 illustrates a low-level attention computation method according to other example embodiments.

The low-level attention computation method using a center-surround histogram is illustrated in FIG. 4.

Two types of neighbor areas may be defined based on a random pixel of a feature map 410, to use the center-surround histogram. That is, a center area 411 and a surround area 412 may be defined based on a reference pixel. The surround area 412 may include the center area 411, and be larger than the center area 411.

The histograms of the center area 411 and the surround area 412 may be extracted, and a feature distance 421 of the center area 411 and the surround area 412 may be obtained using a variety of histogram distance measures. Accordingly, a low-level attention map 420 may be generated based on the feature distance 421 of the center area 411 and the surround area 412.

Referring again to FIG. 1, a variety of methods may be used by the histogram computation unit 136 to compute the histogram distance. For example, a Chi-square $\chi^2$ may be used. When the center area is R, the surround area is $R_s$, and $R^i$ is an $i^{th}$ bin of a histogram that may use a luminance, a color, a texture, and the like, the center-surround histogram may be equal to $\chi^2$ distance of the histogram of the center area and the histogram of the surround area, and may be represented, for example in Equation 1, as follows.

$$\chi^2(R, R_s) = \frac{1}{2} \sum_i \frac{(R^i - R_s^i)^2}{R^i + R_s^i} \qquad \text{Equation 1}$$

The attention map generation unit 137 may generate the visual attention map using the feature information histogram distance.

The low-level attention computation using the at least one feature map may be performed by using a moment of the histogram without using the entire center-surround histogram. The moment may include at least one of a mean, a variance, a standard deviation, and a skewness.

For example, when a $j^{th}$ pixel value of an $i^{th}$ block is $P_{ij}$, associated moments may be represented as follows, in Equation 2, for example.

$$E_i = \frac{1}{N} \sum_{j=1}^{N} p_{ij}, \; \sigma_i = \left( \frac{1}{N} \sum_{j=1}^{N} (p_{ij} - E_i)^2 \right)^{\frac{1}{2}}, \qquad \text{Equation 2}$$

$$s_i = \left( \frac{1}{N} \sum_{j=1}^{N} (p_{ij} - E_i)^3 \right)^{\frac{1}{3}}.$$

Here, $E_i$, $\sigma_i$, and $s_i$ may denote a mean, a variance, and a skewness, respectively, and N may denote a number of pixels in a block.

Also, in this instance, a saliency of a particular block may be defined as follows, in Equation 3, for example.

$$\sum_{B \in \{B_1, B_2, B_3, B_4\}} MDiff(B_0, B), \qquad \text{Equation 3}$$

$$MDiff(B_k, B_l) = w_1 |E_k - E_l| + w_2 |\sigma_k - \sigma_l| + w_3 |s_k - s_l|$$

Here, parameters 'w' may denote a weight to control a relative significance of the moments, and a basic set value may be 1. Also, $B_0$, $B_1$, $B_2$, $B_3$, and $B_4$ may denote blocks illustrated in FIG. 3. Subsequently, a saliency map for each of the at least one downscaled image may be upscaled to a size of the original 2D image, and each pixel may be added. Also, a final saliency map may be obtained by normalization. In this instance, a bi-cubic interpolation, and the like may be used when upscaling. Also, when edges of the final saliency map may blur, or the edges do not match edges of the 2D image, correction may be made using an edge-preserving filter.

Also, the attention computation unit 130 may include the area setting unit 131, a histogram generation unit 135, the histogram computation unit 136, and the attention map generation unit 137.

The area setting unit 131 may set the center area and the surround area with respect to the at least one feature map. The surround area may include the center area. The histogram generation unit 135 may generate a feature information histogram of the center area and a feature information histogram of the surround area.

The histogram computation unit 136 may compute a feature information histogram distance using a moment of the feature information histogram. The attention map generation unit 137 may generate the visual attention map based on the computed feature information histogram distance.

As described above, the center area and the surround area may be set based on a size of the unit block, a histogram distance of each of the center area and the surround area may be computed, and thus a visual attention map based on a user's visual attention may be generated. Also, an apparatus and a method of generating a visual attention map with less computation may be provided.

Figure 5:
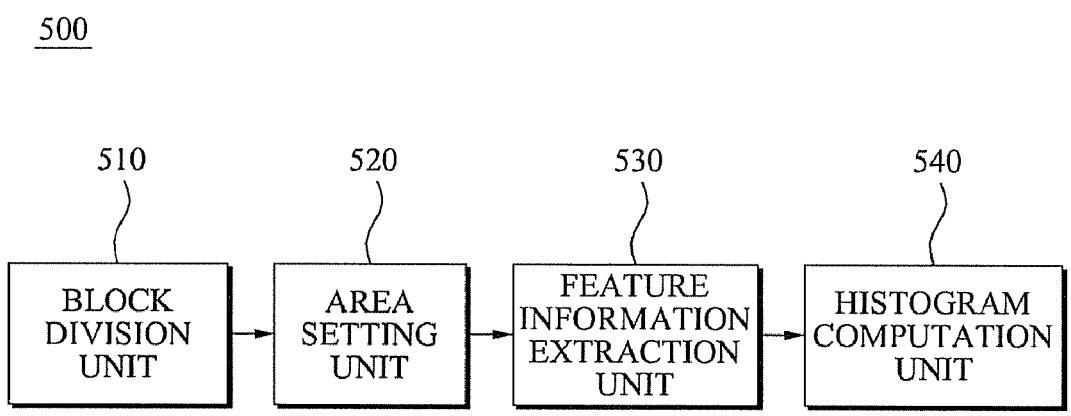
FIG. 5 illustrates a configuration of an apparatus of generating a visual attention map according to other example embodiments.

FIG. 5 illustrates a configuration of an apparatus 500 of generating a visual attention map according to other example embodiments.

Referring to FIG. 5, the apparatus 500 may include a block division unit 510, an area setting unit 520, a feature information extraction unit 530, and a histogram computation unit 540.

The block division unit 510 may divide a 2D image into a plurality of blocks. For example, a unit block to divide the 2D image may be set, and the 2D image may be divided based on the unit block.

The area setting unit 520 may select at least one block of the plurality of blocks as a center area, and select at least one block adjacent to the center area as a surround block.

The feature information extraction unit 530 may extract first feature information of the center area and second feature information of the surround area. That is, feature information of a portion, corresponding to the center area and the surround area, of the 2D image may be extracted.

The histogram computation unit 540 may compute a histogram distance of the first feature information and the second feature information, and generate the visual attention map Since the area setting unit 520 and the histogram computation unit 540 may be similar to the area setting unit 131 and the histogram computation unit 136 described with reference to FIG. 1, further detailed description may be omitted herein.

Figure 6:
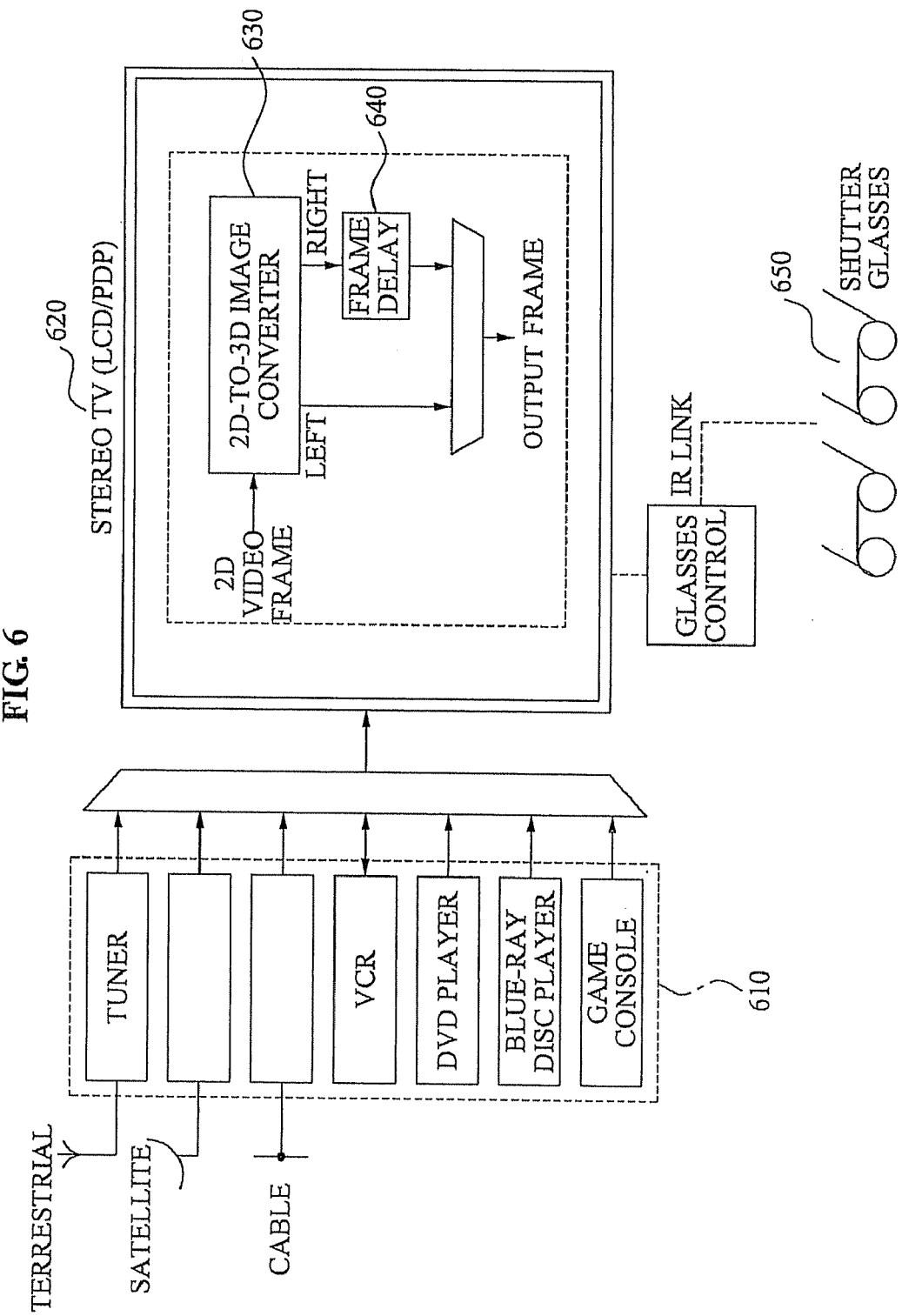
FIG. 6 illustrates a system where a 2D-to-three-dimensional (3D) image converter based on visual attention is applied according to example embodiments.

FIG. 6 illustrates a system where a 2D-to-three-dimensional (3D) image converter 630 based on visual attention is applied according to example embodiments.

The system where the 2D-to-3D image converter 630 based on visual attention is applied to a stereoscopic television (stereo TV) 620 is illustrated in FIG. 6. The 2D-to-3D image converter 630 may be used for all kinds of 2D images that may be viewed in a TV. That is, the 2D-to-3D image converter 630 may be included in a variety of image receiving and reproduction apparatuses 610 such as a terrestrial broadcast tuner, a satellite broadcast receiver, a receiving converter of a cable TV, a video cassette recorder (VCR), a digital video disc (DVD) player, a high-definition television (HDTV) receiver, a blue-ray disc player, a game console, and the like. Also, a 3D image may be displayed by receiving a 2D image from the various image receiving and reproduction apparatuses 610 and displaying.

When an image is inputted to the stereo TV 620, the 2D-to-3D image converter 630 may generate a left eye image and a right eye image of as a stereoscopic method. The stereo TV 620 may alternatingly show the left eye image and the right eye image, and an observer may recognize a 3D image from the images, viewed by a left eye and a right eye, by wearing shutter glasses 650. The shutter glasses 650 may be controlled by an Infrared (IR) ray.

Specifically, the 2D-to-3D image converter 630 may display a visually interesting area to appear relatively close to the observer, and display a visually uninteresting area to appear relatively far away from the observer. The 2D-to-3D image converter 630 is different from a depth-based stereo conversion of a related art.

Also, the 2D-to-3D image converter 630 may extract feature information such as information about a luminance, a color, a texture, a motion, an orientation, and the like, and thereby may generate a visual attention map using the feature information. As described above, the method of generating the visual attention map based on the various feature information may be more precise and robust than a method of generating the visual attention map based on a single feature. Here, a center-surround histogram distance may be extracted to generate the visual attention map using the feature information, and a unit block may be used to set a center area and a surround area. Also, a center area and a surround area with respect to at least one downscaled rectangular image may be set using the unit block by generating the at least one downscaled rectangular image, and a visual attention map may be generated using a distance of the center area histogram and the surround area histogram.

Parallax information of the 2D image may be generated based on the generated visual attention map, and an output frame (or an image) where a frame delay is applied by a frame delay unit 640 may be generated using the parallax information. An observer may see the output frame through the shutter glasses 650, and the like, and thereby may recognize the 3D image.

Figure 7:
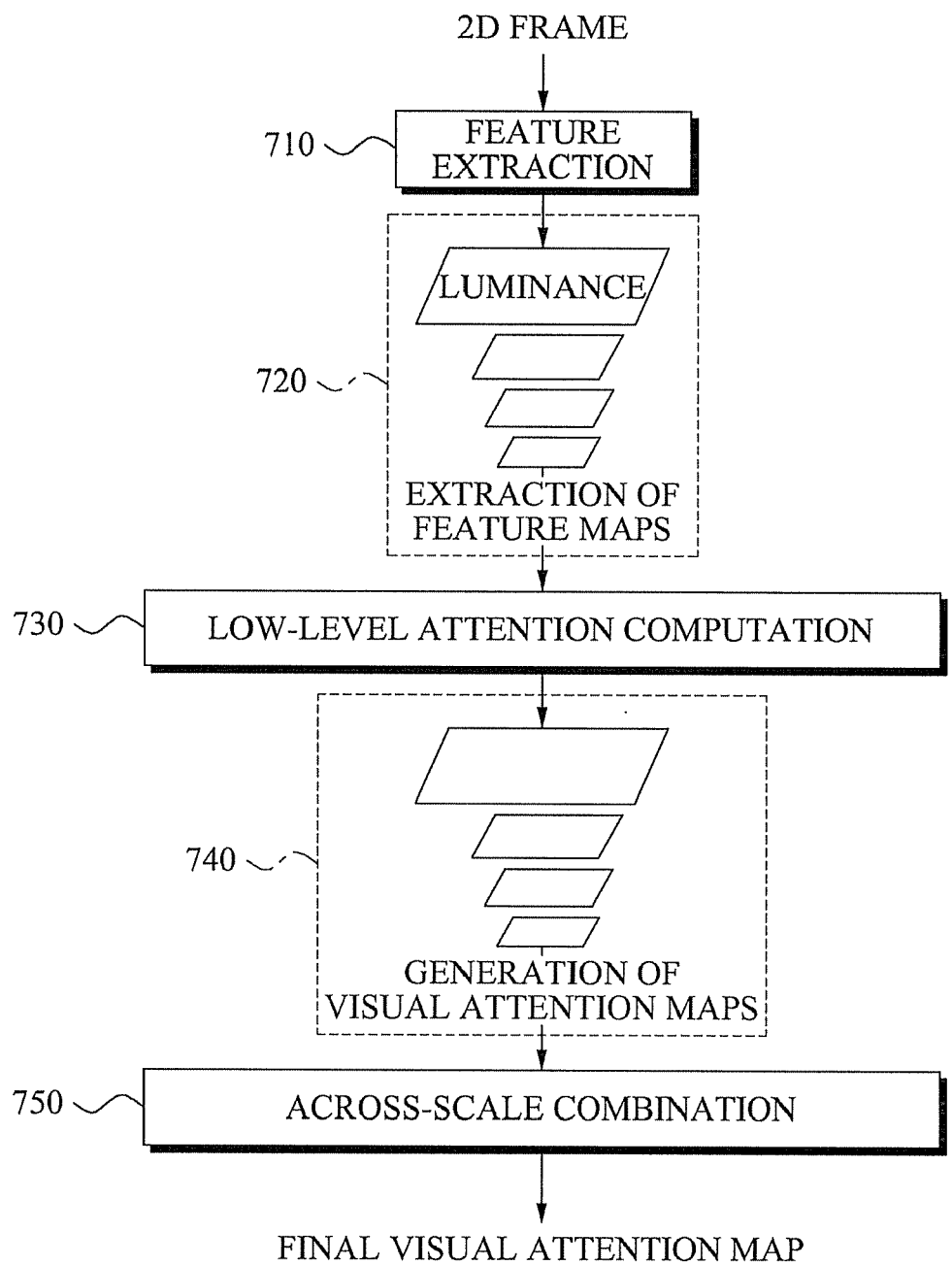
FIG. 7 illustrates a flowchart of a visual attention map generation method according to example embodiments.

FIG. 7 illustrates a flowchart of a visual attention map generation method according to example embodiments.

A size of a generally used 2D image may vary. A size of an HD video, an ultra HD video, and the like may be too large to perform a complex operation with respect to all pixels. Accordingly, a multi-resolution method may be used with respect to the large images for more efficient operation.

In operation 710, feature information associated with visual attention information may be extracted from a 2D image. In operation 720, feature maps in a plurality of scales may be extracted. The feature maps may include the extracted feature information. In this instance, at least one feature map in the plurality of scales may be extracted by downscaling the 2D image to a rectangular image.

In operation 730, a low-level attention computation may be performed using the feature maps in the plurality of scales. In operation 740, visual attention maps in a plurality of scales may be generated.

In operation 750, a final visual attention map may be generated using the visual attention maps in the plurality of scales.

Accordingly, by decreasing a number of operations with respect to each pixel of a high-resolution image, complexity may be reduced and more information about an entire or a partial area may be provided.

Figure 8:
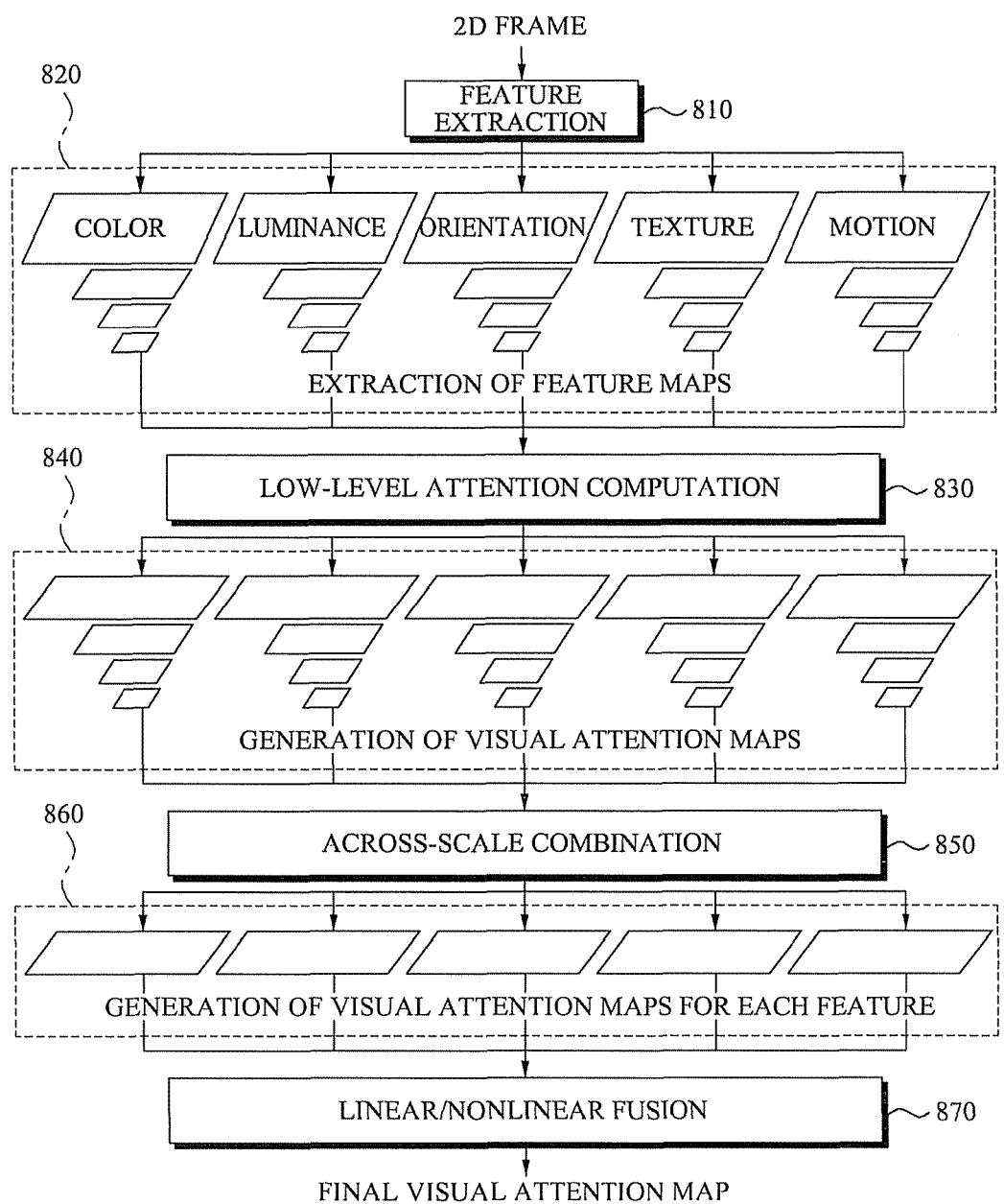
FIG. 8 illustrates a flowchart of a visual attention map generation method according to other example embodiments.

FIG. 8 illustrates a flowchart of a visual attention map generation method according to other example embodiments.

Referring to FIG. 8, in operation 810, feature information associated with visual attention information may be extracted from a 2D image. In operation 820, a plurality of feature maps in a plurality of scales may be extracted. The plurality of feature maps may include the extracted feature information. In this instance, at least one feature map in the plurality of scales may be extracted by downscaling the 2D image to a rectangular image.

In operation 830, low-level attention computation may be performed using the plurality of feature maps in the plurality of scales. In operation 840, a plurality of visual attention maps in a plurality of scales may be generated.

In operation 850, the plurality of visual attention maps in the plurality of scales may combine all features. In operation 860, the plurality of visual attention maps for each of the features may be generated.

In operation 870, a final visual attention map may be generated through a linear fusion or a nonlinear fusion of the plurality of visual attention maps.

As described above, the final visual attention map may be generated to enable a visually interesting area to be located relatively close to an observer and enable an uninteresting area to be located relatively far away from the observer. Accordingly, parallax may be generated and used for the conversion to a 3D image. Thus, a more realistic stereoscopic 3D image may be provided.

Figure 9:
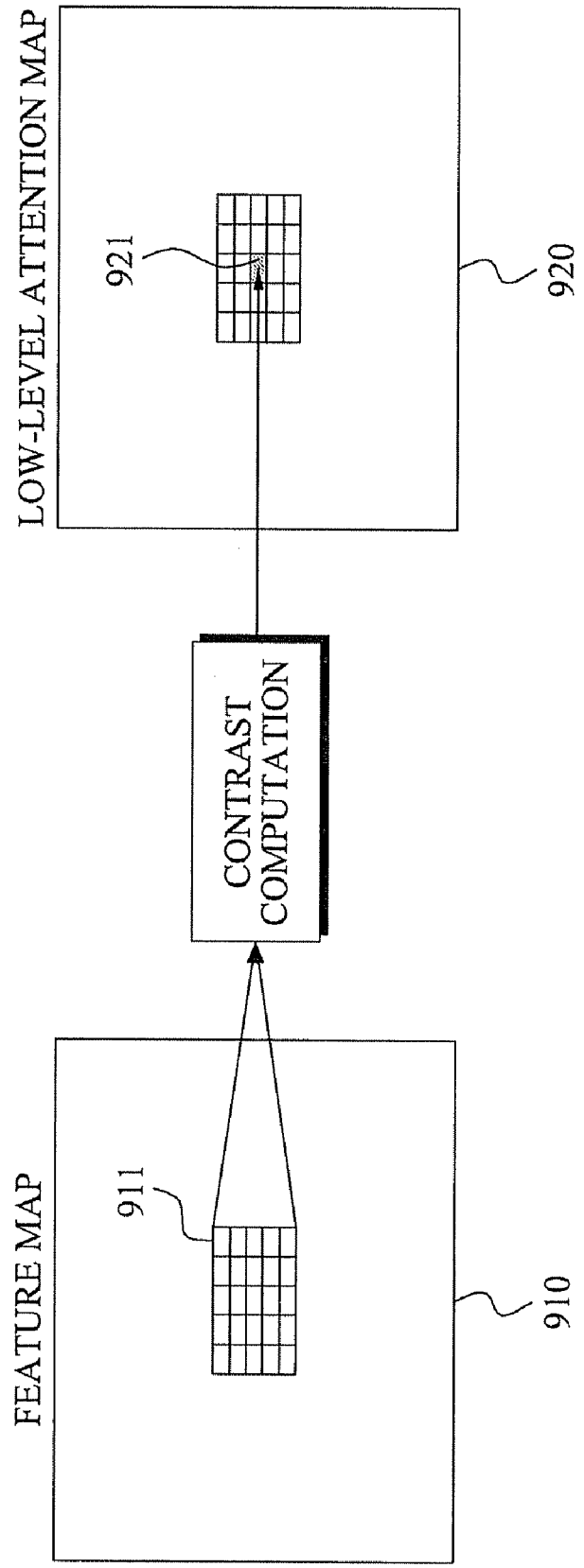
FIG. 9 illustrates a low-level attention computation method according to example embodiments.

FIG. 9 illustrates a low-level attention computation method according to example embodiments.

Referring to FIG. 9, an analysis on a feature map 910 is required to compute a low-level attention map 920. For this, a contrast computation may be performed to generate a final visual attention map through the analysis of the feature map 910.

An attention value 921 of a random pixel may be defined as a feature distance 911 with neighbor pixels. In this instance, the feature distance 911 may be defined to be appropriate for a metric of each feature value. For example, a luminance may be applied to an absolute difference, a squared difference, and the like, and a color may be applied to a Euclidean space in a color space, and the like.

Also, a computation of a contrast-based attention map illustrated in FIG. 9 may be used for all the features associated with visual attention.

Figure 10:
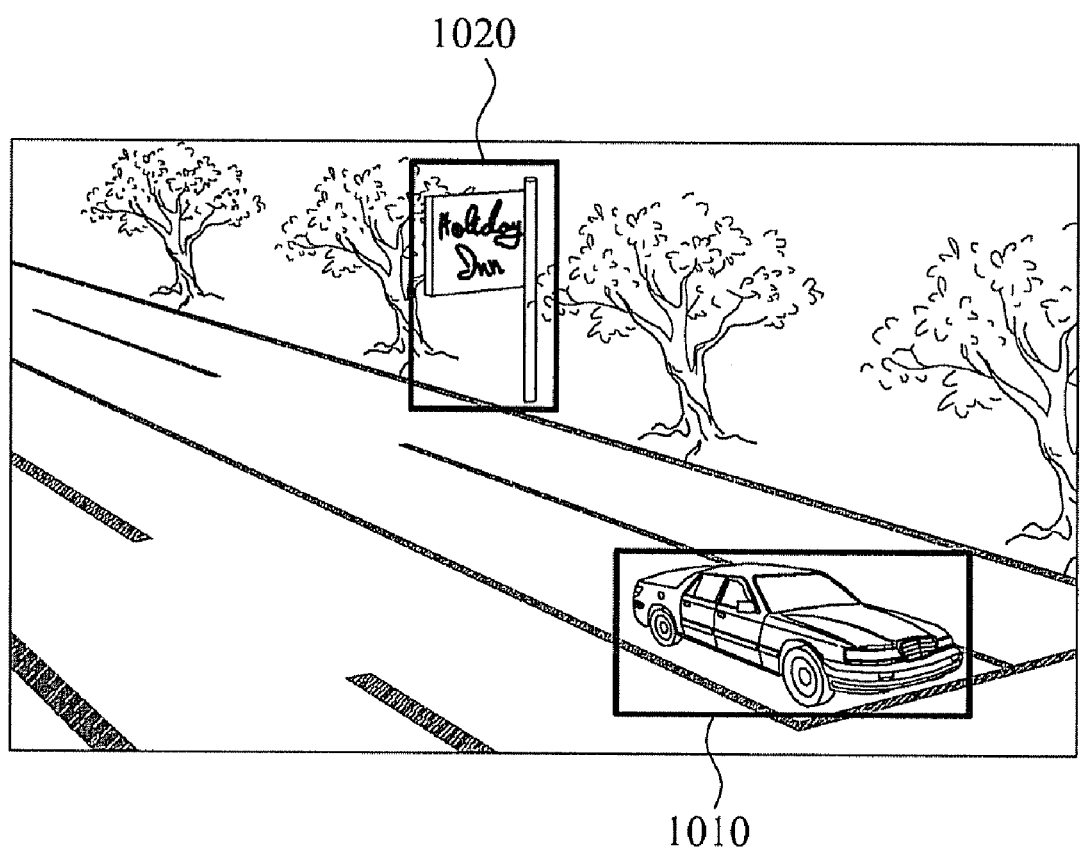
FIG. 10 illustrates computing of an attention of an object using a rectangular block, according to example embodiments.

FIG. 10 illustrates computing of an attention of an object using a rectangular block, according to example embodiments.

Referring to FIG. 10, combining objects 1010 and 1020 based on a rectangular block may be more simple and accurate than combining the objects 1010 and 1020 based on a square block. Accordingly, a 2D image may be downscaled to a rectangular image to combine objects based on a rectangular unit block.

Figure 11:
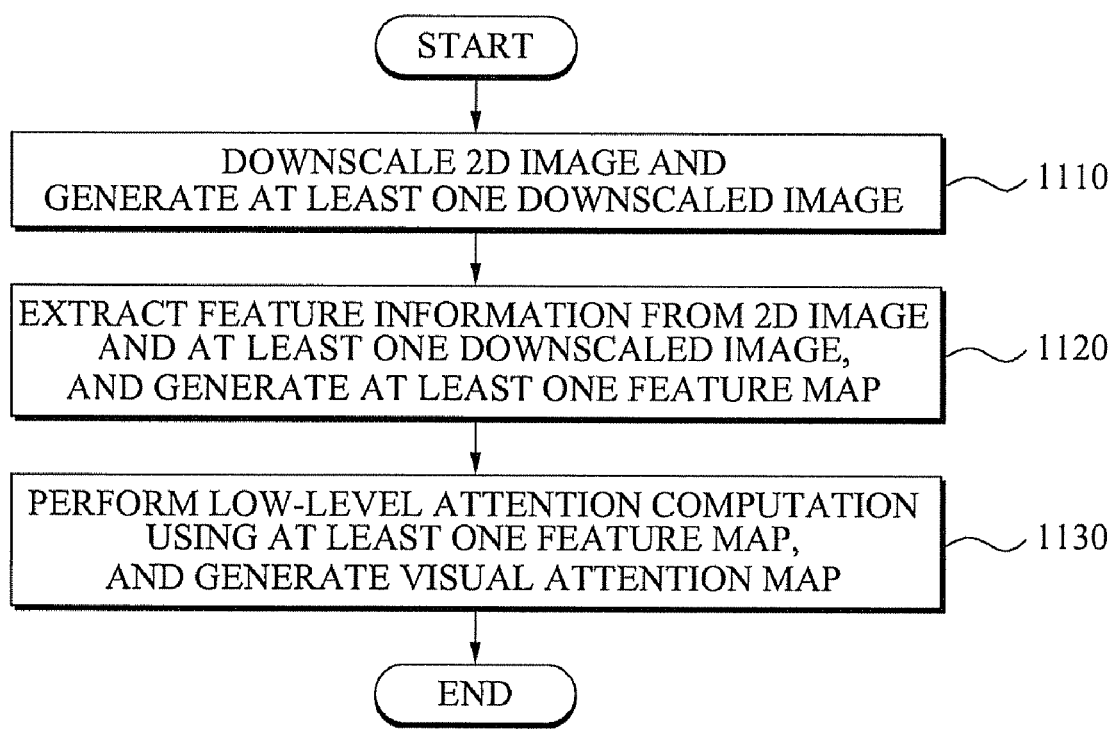
FIG. 11 illustrates a flowchart of a method of generating a visual attention map according to example embodiments.

FIG. 11 illustrates a flowchart of a method of generating a visual attention map according to example embodiments.

Referring to FIG. 11, in operation 1110, a 2D image may be downscaled and at least one downscaled image may be generated.

In operation 1120, feature information may be extracted from the 2D image and the at least one downscaled image, and at least one feature map may be generated.

In operation 1130, low-level attention computation may be performed using the at least one feature map, and the visual attention map may be generated based on a result of the low-level attention computation. The low-level attention computation in operation 1130 is further detailed with reference to FIG. 12 or FIG. 14, for example.

Figure 12:
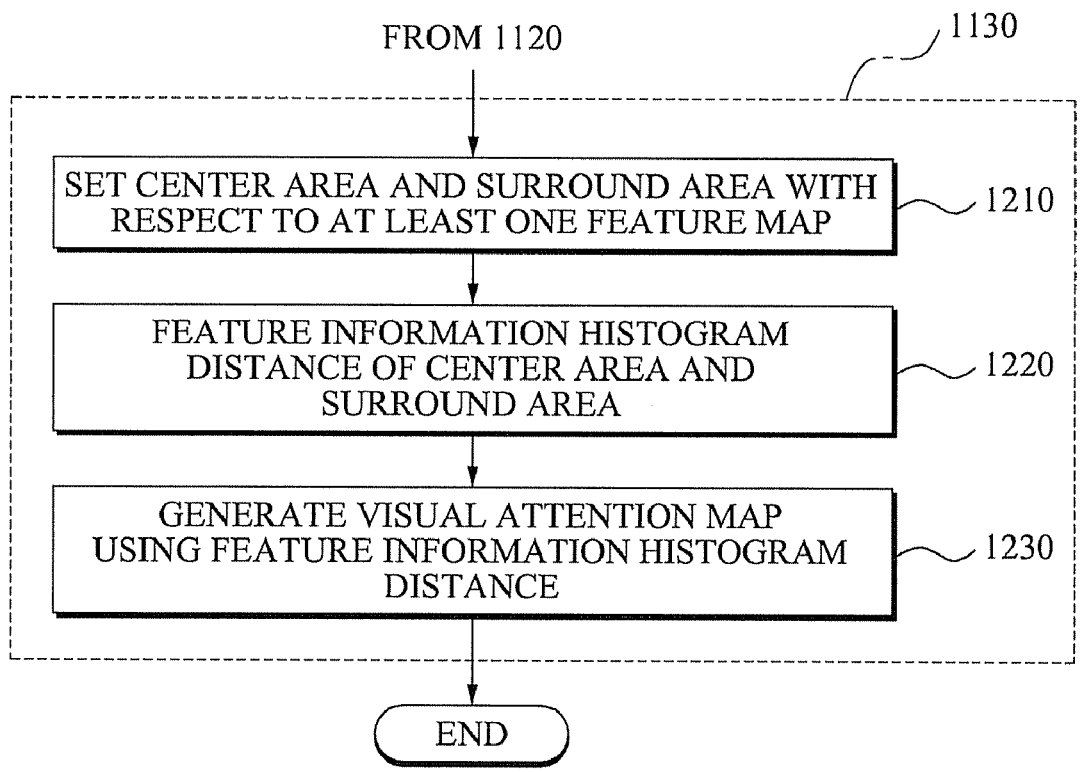
FIG. 12 illustrates a flowchart of an operation of generating a visual attention map through a low-level attention computation, for example, the low-level attention computation of FIG. 11.

FIG. 12 illustrates a flowchart of operation of generating a visual attention map through a low-level attention computation, for example, the low-level attention computation of FIG. 11.

Referring to FIG. 12, in operation 1210, a center area and a surround area may be set with respect to the at least one feature map. The surround area may include the center area. The setting in operation 1210 is further detailed with reference to FIG. 13, for example.

Figure 13:
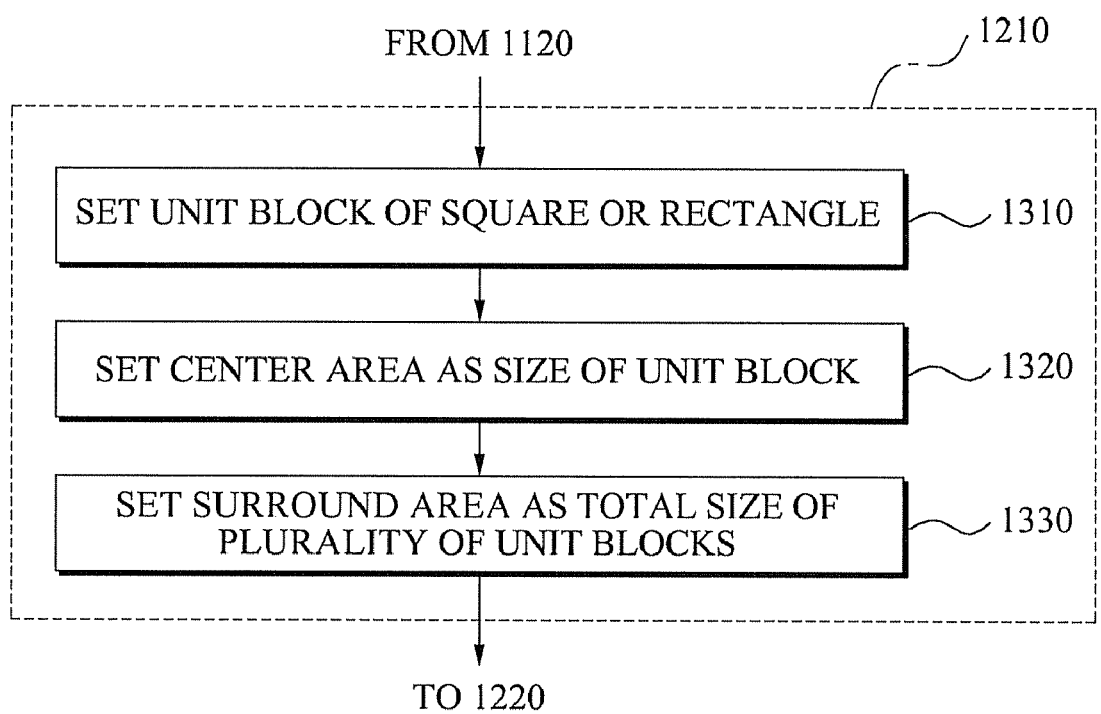
FIG. 13 illustrates a flowchart of an operation of setting an area, for example, the area of FIG. 12.

FIG. 13 illustrates a flowchart of an operation of setting an area of FIG. 12.

Referring to FIG. 13, in operation 1310, a unit block of a square or a rectangle may be set.

In operation 1320, the center area may be set as a size of the unit block.

In operation 1330, the surround area may be set as a total size of a plurality of unit blocks. That is, the plurality of unit blocks is combined to set the surround area.

Referring again to FIG. 12, in operation 1220, a feature information histogram distance between the center area and the surround area may be computed.

In operation 1230, the visual attention map may be generated using the computed feature information histogram distances.

Figure 14:
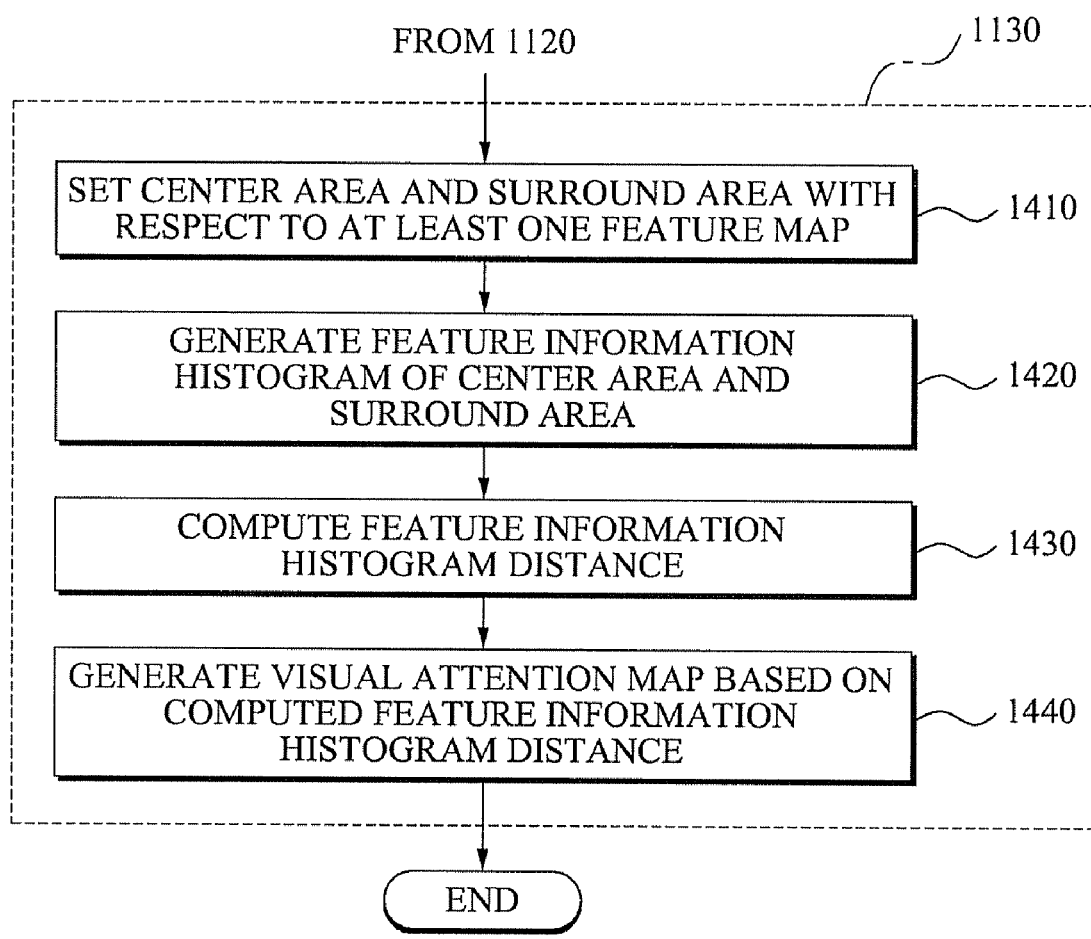
FIG. 14 illustrates a flowchart of another operation of generating a visual attention map through the low-level attention computation, for example, the low-level attention computation of FIG. 11.

FIG. 14 illustrates a flowchart of another operation of generating the visual attention map through a low-level attention computation, for example, the low-level attention computation of FIG. 11.

Referring to FIG. 14, in operation 1410, a center area and a surround area may be set with respect to the at least one feature map. The surround area may include the center area.

In operation 1420, a feature information histogram of the center area and the surround area may be generated. Here, the histogram may be at least one of an intensity histogram and a color histogram.

In operation 1430, a feature information histogram distance may be computed using a moment of the feature information histogram. The moment may include at least one of a mean, a variance, a standard deviation, and a skewness.

In operation 1440, the visual attention map may be generated based on the computed feature information histogram distance.

Descriptions that have not been described in FIG. 11 through FIG. 14 may refer to the descriptions that have been provided in FIG. 1 through FIG. 10.

As described above, when generating a visual attention map, a center area and a surround area may be set based on a size of a unit block, a histogram distance of the two areas may be obtained using a moment of histograms or an entire histogram of the two areas, and thus a memory resource and time complexity may be reduced.

The intermediate image generation method according to the above-described example embodiments may also be implemented through computer readable code/instructions in/on a medium, e.g., a computer readable medium, to control at least one processing element to implement any above described embodiment. The medium can correspond to medium/media permitting the storing or transmission of the computer readable code.

The computer readable code can be recorded or transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media. The media may also be a distributed network, so that the computer readable code is stored or transferred and executed in a distributed fashion. Still further, as only an example, the processing element could include a processor or a computer processor, and processing elements may be distributed or included in a single device.

In addition to the above described embodiments, example embodiments can also be implemented as hardware, e.g., at least one hardware based processing unit including at least one processor capable of implementing any above described embodiment.

Although a few example embodiments have been shown and described, it would be appreciated by those skilled in the art that changes may be made in these example embodiments without departing from the principles and spirit of the disclosure, the scope of which is defined in the claims and their equivalents.

What is claimed is:

1. An apparatus of generating a visual attention map, the apparatus comprising:
    a downscaling unit to downscale a two-dimensional (2D) image and to generate at least one downscaled image;
    a feature map generation unit to extract feature information from the 2D image and the at least one downscaled image, and to generate at least one feature map; and
    an attention computation unit to perform low-level attention computation using the at least one feature map, and to generate the visual attention map based on a result of the low-level attention computation.

2. The apparatus of claim 1, wherein the downscaling unit downscales the 2D image into a plurality of rectangular blocks.

3. The apparatus of claim 1, wherein the downscaling unit comprises:
    a horizontal downscaling unit to downscale the 2D image in a horizontal direction, and to generate the at least one downscaled image; and
    a vertical downscaling unit to downscale the 2D image in a vertical direction, and to generate the at least one downscaled image.

4. The apparatus of claim 1, wherein the attention computation unit comprises:
    an area setting unit to set a center area and a surround area with respect to the at least one feature map, the surround area including the center area;
    a histogram computation unit to compute a feature information histogram distance between the center area and the surround area; and
    an attention map generation unit to generate the visual attention map using the feature information histogram distance.

5. The apparatus of claim 4, wherein feature information histograms of the feature information histogram distance are at least one of an intensity histogram and a color histogram.

6. The apparatus of claim 4, wherein the histogram computation unit computes the feature information histogram distance using a Chi-square of a histogram of the center area and a histogram of the surround area.

7. The apparatus of claim 4, wherein the area setting unit comprises:
    a unit block setting unit to set a unit block of a square or a rectangle;
    a center area setting unit to set the center area as a size of the unit block; and
    a surround area setting unit to set the surround area as a total size of a plurality of unit blocks.

8. The apparatus of claim 1, wherein the attention computation unit comprises:
    an area setting unit to set a center area and a surround area with respect to the at least one feature map, the surround area including the center area;
    a histogram generation unit to generate respective feature information histograms of the center area and the surround area;
    a histogram computation unit to compute a feature information histogram distance using a moment of the feature information histograms; and
    an attention map generation unit to generate the visual attention map based on the feature information histogram distance,
    wherein the moment includes at least one of a mean, a variance, a standard deviation, and a skewness.

9. An apparatus of generating a visual attention map, the apparatus comprising:
    a block division unit to divide a 2D image into a plurality of blocks;
    an area setting unit to select at least one block of the plurality of blocks as a center area, and to select at least one block from a surround area adjacent to the center area as a surround block;
    a feature information extraction unit to extract first feature information of the center area and second feature information of the surround area; and
    a histogram computation unit to compute a histogram distance between the first feature information and the second feature information, and to generate the visual attention map.

10. The apparatus of claim 9, wherein the histogram computation unit computes the histogram distance using a Chi-square of a histogram of the first feature information and a histogram of the second feature information.

11. The apparatus of claim 9, wherein the histogram computation unit generates the visual attention map using a moment of respective histograms of the first feature information and the second feature information, the moment including at least one of a mean, a variance, a standard deviation, and a skewness.

12. A method of generating a visual attention map, the method comprising:
    downscaling a 2D image and generating at least one downscaled image;
    extracting feature information from the 2D image and the at least one downscaled image, and generating at least one feature map; and
    performing low-level attention computation using the at least one feature map, and generating the visual attention map based on a result of the low-level attention computation.

13. The method of claim 12, wherein the generating of the at least one downscaled image comprises:
    downscaling the 2D image in a horizontal direction, and generating the at least one downscaled image; and
    downscaling the 2D image in a vertical direction, and generating the at least one downscaled image.

14. The method of claim 12, wherein the generating of the visual attention map comprises:
    setting a center area and a surround area with respect to the at least one feature map, the surround area including the center area;
    computing a feature information histogram distance between the center area and the surround area; and
    generating the visual attention map using the feature information histogram distance.

15. The method of claim 14, wherein feature information histograms of the feature information histogram distance are at least one of an intensity histogram and a color histogram.

16. The method of claim 14, wherein the computing of the feature information histogram distance uses a Chi-square of a histogram of the center area and a histogram of the surround area.

17. The method of claim 14, wherein the setting of the center area and the surround area comprises:
- setting a unit block of a square or a rectangle;
- setting the center area as a size of the unit block; and
- setting the surround area as a total size of a plurality of unit blocks.

18. The method of claim 12, wherein the generating of the visual attention map comprises:
- setting a center area and a surround area with respect to the at least one feature map, the surround area including the center area;
- generating respective feature information histograms of the center area and the surround area;
- computing a feature information histogram distance using a moment of the feature information histograms; and
- generating the visual attention map based on the feature information histogram distance, wherein the moment includes at least one of a mean, a variance, a standard deviation, and a skewness.

19. A non-transitory computer-readable recording medium storing a program causing at least one processing element to implement a method of generating a visual attention map, the method comprising:
- downscaling a 2D image and generating at least one downscaled image;
- extracting feature information from the 2D image and the at least one downscaled image, and generating at least one feature map; and
- performing low-level attention computation using the at least one feature map, and generating the visual attention map based on a result of the low-level attention computation.

* * * * *